(12) United States Patent
Casagrande et al.

(10) Patent No.: US 11,541,824 B2
(45) Date of Patent: Jan. 3, 2023

(54) REDUCED FOOTPRINT VACUUM MOUNTED HITCH RACK CARRIER SYSTEMS FOR VEHICLES

(71) Applicant: SEASUCKER, LLC, Sarasota, FL (US)

(72) Inventors: Charles L. Casagrande, Bradenton, FL (US); Bradley Kapper, Bradenton, FL (US); Sandor Kormos, Bradenton, MO (US)

(73) Assignee: SEASUCKER, LLC, Sarasota, FL (US)

( * ) Notice: Subject to any disclaimer, the term of this patent is extended or adjusted under 35 U.S.C. 154(b) by 0 days.

(21) Appl. No.: 17/516,184

(22) Filed: Nov. 1, 2021

(65) Prior Publication Data

US 2022/0048439 A1 Feb. 17, 2022

Related U.S. Application Data

(62) Division of application No. 16/620,808, filed as application No. PCT/US2018/036951 on Jun. 11, 2018, now Pat. No. 11,161,460.

(Continued)

(51) Int. Cl.
*B60R 9/06* (2006.01)
*B60R 9/10* (2006.01)
(Continued)

(52) U.S. Cl.
CPC ............... *B60R 11/00* (2013.01); *B60R 9/06* (2013.01); *B60R 9/10* (2013.01); *B60R 9/04* (2013.01); *B60R 2011/0056* (2013.01)

(58) Field of Classification Search
CPC .......... B60R 9/04; B60R 9/045; B60R 9/048; B60R 9/058; B60R 9/06; B60R 9/10; B60R 2011/0056

(Continued)

(56) References Cited

U.S. PATENT DOCUMENTS 2,431,400 A 7/1946 Iverson
3,204,839 A 12/1963 Yuda et al.
(Continued)

FOREIGN PATENT DOCUMENTS

DE 102006036983 A1 2/2007
DE 202018002567 U1 * 2/2019
KR 100940449 B1 2/2010

OTHER PUBLICATIONS

Written Opinion of the corresponding International PCT Application PCT/US2018/036951 dated Aug. 27, 2018.

(Continued)

*Primary Examiner* — Justin M Larson
(74) *Attorney, Agent, or Firm* — Sandberg Phoenix & von Gontard PC

(57) ABSTRACT

A vacuum-based hitch rack carrier system for a vehicle having a rear hitch and rear hitch receiver. The system includes a plurality of vacuum devices having a pad shaped and sized to removably seat with a vehicle to form a vacuum cavity, a plunger attached to the pad and in fluid communication with the vacuum cavity, and an indicator associated with the vacuum device to indicate the level of vacuum pressure within the vacuum. The system has a receiver hitch adapter for joining a rack configured to secure an article to the vehicle via attachment to the rear hitch receiver, a mount shaped and sized to mate and secure the article to the rack, and one or more support bars attached to said mount. At least one of the support bars contains a break and fold assembly configured to allow the carrier system to be folded.

8 Claims, 12 Drawing Sheets

Related U.S. Application Data

(60) Provisional application No. 62/517,702, filed on Jun. 9, 2017.

(51) Int. Cl.
  *B60R 11/00* (2006.01)
  *B60R 9/04* (2006.01)

(58) Field of Classification Search
  USPC .................................. 224/559, 924; 403/102
  See application file for complete search history.

(56) References Cited

U.S. PATENT DOCUMENTS

| | | | |
|---|---|---|---|
| 3,295,732 A | 10/1965 | Haven | |
| 3,670,935 A | 6/1972 | Hinkston | |
| 3,776,437 A | 12/1973 | Carney | |
| 4,219,142 A * | 8/1980 | Macpherson | B60R 9/10 224/924 |
| 4,234,112 A | 11/1980 | Gallant | |
| 4,299,346 A | 11/1981 | Helm | |
| 4,345,705 A | 8/1982 | Graber | |
| 4,386,709 A | 6/1983 | Graber | |
| 4,437,480 A | 3/1984 | Husa | |
| 4,611,945 A | 9/1986 | Diego | |
| 4,676,413 A * | 6/1987 | Began | B60R 9/10 224/535 |
| 5,178,583 A | 1/1993 | Rankin | |
| 5,217,315 A | 6/1993 | Rosane | |
| 5,476,203 A | 12/1995 | Fletcher | |
| 5,658,119 A | 8/1997 | Allsop et al. | |
| 5,746,533 A | 5/1998 | Schmidt | |
| 5,794,828 A | 8/1998 | Colan et al. | |
| 5,820,002 A | 10/1998 | Allen | |
| 5,947,357 A | 9/1999 | Surkin | |
| 6,234,372 B1 | 5/2001 | Rivera | |
| 6,237,983 B1 | 5/2001 | Yang | |
| 6,244,483 B1 | 6/2001 | McLemore et al. | |
| 6,446,850 B2 | 9/2002 | Ming-Shun | |
| 6,736,301 B1 | 5/2004 | Huang | |
| 6,752,303 B2 | 6/2004 | McLemore et al. | |
| 6,908,138 B2 | 6/2005 | Yang | |
| 7,806,307 B2 | 10/2010 | Bergerhoff et al. | |
| 9,096,182 B1 | 8/2015 | Roth et al. | |
| 9,371,042 B1 | 6/2016 | Dratewski | |
| 9,902,454 B1 | 2/2018 | Keci | |
| D887,823 S | 6/2020 | Joe | |
| 10,723,276 B2 | 7/2020 | Casagrande | |
| D893,977 S | 8/2020 | Staniszewski et al. | |
| 10,863,803 B2 | 12/2020 | Strum et al. | |
| 2001/0035446 A1 | 11/2001 | Walstrom et al. | |
| 2003/0132259 A1 | 7/2003 | McLemore et al. | |
| 2008/0007040 A1 | 1/2008 | Maucher et al. | |
| 2012/0168481 A1 | 7/2012 | Casagrande | |
| 2014/0076949 A1 | 3/2014 | Casagrande | |
| 2020/0198546 A1 * | 6/2020 | Casagrande | F16B 7/0413 |
| 2022/0258674 A1 * | 8/2022 | Polster | F16B 47/00 |

OTHER PUBLICATIONS

International Search Report of the corresponding International PCT Application PCT/US2018/036951 dated Aug. 27, 2018.

* cited by examiner

REDUCED FOOTPRINT VACUUM MOUNTED HITCH RACK CARRIER SYSTEMS FOR VEHICLES

CROSS-REFERENCE TO RELATED APPLICATIONS

This application is a divisional of U.S. patent application Ser. No. 16/620,808 filed on Dec. 9, 2019, which is a U.S. National Stage under 35 U.S.C. § 371 of International Application No. PCT/US2018/036951, filed Jun. 11, 2018, which claims priority to U.S. Provisional Application No. 62/517,702 filed Jun. 9, 2017 entitled REDUCED FOOTPRINT VACUUM MOUNTED CARRIERS FOR VEHICLES, the content of each which is incorporated herein by reference.

STATEMENT REGARDING FEDERALLY SPONSORED RESEARCH

Not Applicable.

BACKGROUND

The present disclosure relates to a vacuum carrier system that detachably installs to automotive vehicles and other mobile transports, and more particularly, to such carrier systems that are readily stored and provide for a small or reduced size and environmental footprint. The impact on the environment is considerable when energy differentials are added together.

Standard mobile carriers or racks used with automotive vehicles to transport various recreational equipment, such as, bicycles, skis, and other various articles, largely consist entirely of cumbersome bars and fasteners, either permanently attached or removably attached to a vehicle with brackets, straps and latches to handle the carriers load-carrying functions.

In a significant step away from this standard carrier paradigm, Charles Casagrande and others associated with Seasucker, LLC of Sarasota/Bradenton, Fla., invented an entirely different system in which vacuum devices with powerful holding action were used to provide the carrying capacity, yet while doing so safely, flexibly and with smaller lightweight components. Certain of these vacuum-based mounted carriers for use in transporting bicycles and other articles such as other recreational equipment, were previously disclosed, inter alia, in U.S. patent application Ser. No. 13/497,653 and issued U.S. Pat. No. 9,831,721, each of which is hereby fully incorporated herein by reference as though expressly set forth herein.

While the Seasucker LLC vacuum-based carrier system has addressed major issues posed by the standard "bars and brackets" variety of carriers, there remains a need for reducing even further the "footprint" of such vacuum-based carrier systems, making them take up less space and using less energy than their conventional counterparts when in use, and also making them readily stow-able when not currently needed. Further, vacuum-based carriers or racks with these common features are needed for use with a variety of vehicles, being more suited for travel, and, in particular, for use by racing teams when up to nine bikes, up to four of which could be immediately "race ready," would be highly desirable. The background of these needs addressing specific situations are further discussed herein.

Race ready racks have been used for decades with professional racing. It is required during a race to have extra bikes ready when and if the rider has a mechanical issue or crash, and needs a new bike to continue in the race. Bike races are often won by mere seconds and a fast and efficient bike rack system to supply fresh racing bikes is essential. "Race ready" racks currently available are generally custom made out of aluminum or steel and are welded. This created a one off fixed position rack. The process of designing the rack depends on what vehicle it is going to be used on. Race teams typically have 1-2 year deals with a particular car manufacturer and from year to year they change models, which also requires the rack to be sent back and re-welded. In some cases it is not even worth doing so and a new rack must be purchased. Each new vehicle has different angles and dimensions for its roof and requires new positioning of racks which is not easy, or sometimes, not possible with some rack/car combinations. Many manufacturers are currently coming out with car models without roof rails and some have all glass roofs which are difficult to attach to. Such fixed racks are not compatible at all in these situations, and therefore, cannot be used. These racks tend to be quite heavy and cannot be traveled with due to the size of the footprint being the size of a car roof.

It would thus be desirable to create a 7-9 bicycle capacity bike rack with a reduced foot print which could be used for team competitions, with at least 4 race ready positions where the entire bike can be almost instantly taken off. Further, it would be advantageous if such a rack could fit any car without needing special adaptors or fixed or welded attachments so the rack can be used on multiple vehicles and when the team gets a new vehicle the rack can be switched to a new car in just minutes. It is also desirable that such a rack be lightweight and disassembled easily and fit into a travel case that can be checked in as baggage for travel.

Crossbars on vehicle roofs have been used for a long time. A significant problem is that the size of these bars typically need to be long enough to span the roof of a vehicle to hold items such as cargo boxes, bikes, kayaks, and stand up paddle boards and creates problems with storage or travel with the bars. It is typically too difficult to continually take fixed bars off and put them back on during travel when items are this long. Bracketry is commonly used to permanently attach bars to roofs and are very vehicle specific. Different brackets must be used for different vehicles. It has been estimated that it can cost upwards of $300.00 or more a year to keep bars on the roof of a vehicle due just to wind resistance-generated extra fuel used to drive around with the empty bars on a car roof. In total, this adds up to a huge waste of fuel worldwide. It is not practical to take apart and remove these permanently affixed cross bars when they are not in use, so most people simply incur the fuel penalty.

Thus, it would therefore be advantageous to create a cross bar system that is adjustable to fit any vehicle without requiring permanent or difficult-to-disassemble bracketry. It would also be desirable to have cross bars that can be detached in seconds and easily stored within the vehicle for travel and readily available to take out of a vehicle or storage locker to be placed back on the roof when needed to carry an item. When nothing is needed on the cross bars, it would be desirable if they could come off without the wasted fuel being incurred driving the unused bars around for no reason.

Conventional racks are typically designed for use with a specific make and model of vehicle. Therefore, they generally do not work on different vehicles, at least not without adaptors or modifications. As a result, manufacturers must produce an increased number of parts and retailers must provide an ever increasingly complex list of parts options lists to consumers, which also increases the cost. In addition, consumers that purchase a rack for one vehicle cannot use the same rack for a different vehicle.

Therefore, a carrier that is easily and reliably installed and removed from a multiple vehicles is needed that maintains the integrity of a mounting surface.

One of the most popular methods to carry bikes on a vehicle is via a hitch on the rear of the vehicle. Instead of using the hitch for towing, the hitch receiver is used to accept a bike rack. These racks are typically very heavy and large and must be built extremely heavy duty to ensure the integrity of the rack and to minimize shaking. This is difficult to achieve since everything in such a system relies on the bar attachment inserted into the receiver hitch and the rack needs to be extended a great distance from the hitch to accommodate carrying bicycles. Thus, there is a tendency for the rack to sway and move, and for the system to fail. To keep it steady and strong the materials are typically required to be heavy and cumbersome. This type of rack is one which can be unsafe, fuel inefficient, and one that cannot readily be traveled with due to its cumbersome size and weight.

It would therefore be desirable to create a hitch rack system light enough and foldable so that it can easily be taken off and even traveled with. This is accomplished according to the below described embodiments without compromising the stability of the rack, and it is ensured to have a steady non-moving rack system despite using less materials and a lighter weight design for a reduced footprint.

BRIEF SUMMARY OF THE INVENTION

Accordingly, applicant has developed vacuum-based carrier systems which greatly reduces the footprint for vehicular racks and address the other needs as noted above, while providing multiple additional advantages.

In one aspect, a carrier system for a vehicle is provided which includes a plurality of vacuum devices, each having a pad shaped and sized to removably seat with a vehicle to form a vacuum cavity. A plunger is attached to the pad and is in fluid communication with the vacuum cavity. Additionally, an indicator is associated with the vacuum device to indicate the level of vacuum pressure within the vacuum. The system also includes a mount shaped and sized to mate and secure a recreational article, with one or more support bars being attached to the mount. Additionally, the one or more support bars contains a break and fold assembly configured to allow the carrier system to be folded so that it can be stored away.

According to another aspect of the invention, a race ready carrier rack system is provided which includes a front support bar, a rear support bar, at least 2 side support bars, and at least one intermediate support cross bar between the front and rear support bars. At least two vacuum mount assemblies are attached to the front bar and at least two vacuum mount assemblies are attached to the rear bar for secure attachment to a vehicle. In the system, at least one crank arm clamp is attached to one or more of the support bars for single point attachment of a bicycle and the race ready carrier rack further comprises points of attachment for additional bicycles. Preferably, the race ready carrier rack includes at least one support bar which includes a break and fold assembly component configured to allow the carrier system to be folded for easy of storage and travel.

DESCRIPTION OF THE DRAWINGS

In the accompanying drawings which form part of the specification.

Corresponding reference numerals indicate corresponding parts throughout the several figures of the drawings.

DETAILED DESCRIPTION

Figure 1:
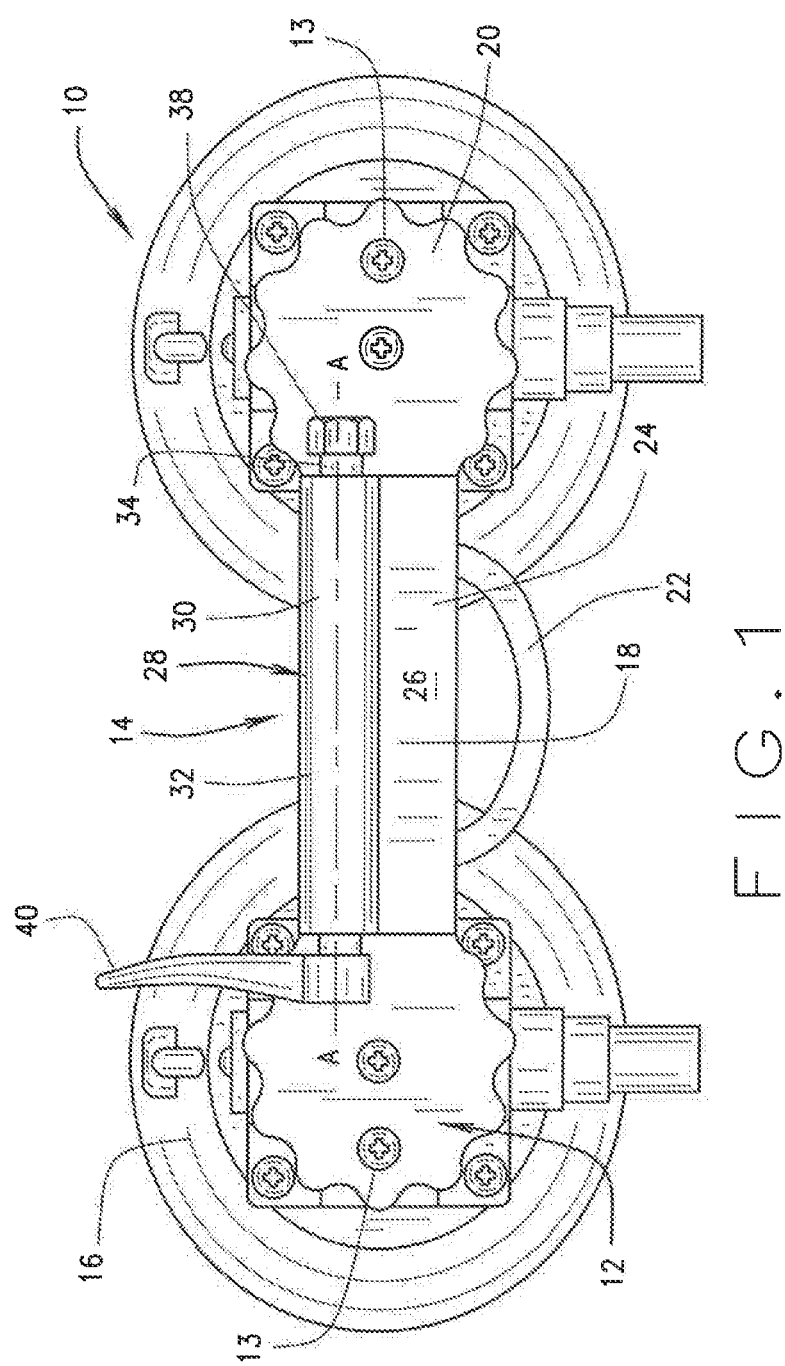
FIG. 1 is a perspective view of a carrier system.

The following detailed description illustrates the claimed invention by way of example and not by way of limitation. The description enables one skilled in the art to make and use the disclosure, describes several embodiments, adaptations, variations, alternatives, and uses of the disclosure, including what is presently believed to be the best mode of carrying out the claimed invention. Additionally, it is to be understood that the disclosure is not limited in its application to the details of construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting.

Figure 2:
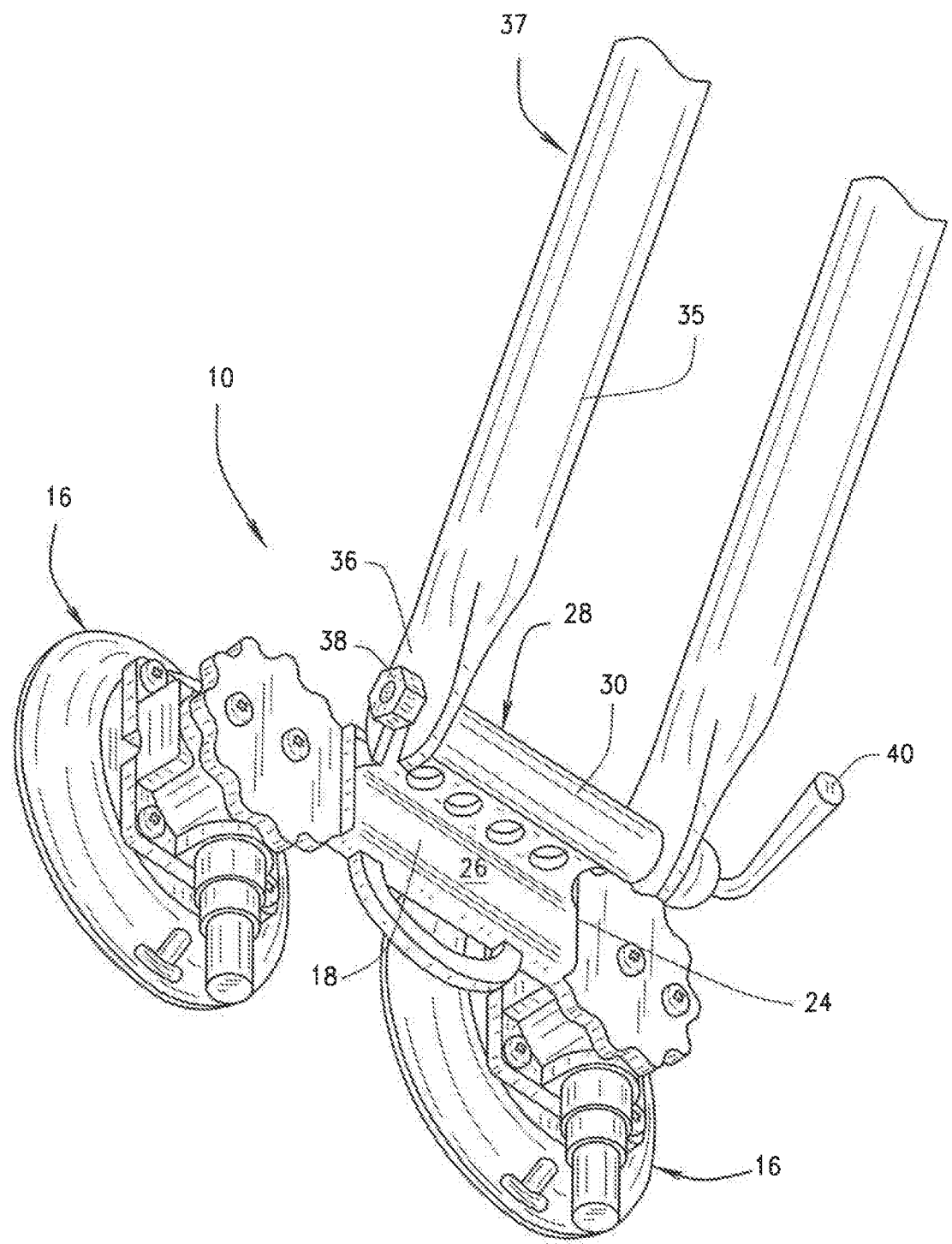
FIG. 2 is a perspective view of the carrier system of FIG. 1 securing a bicycle.
Figure 3:
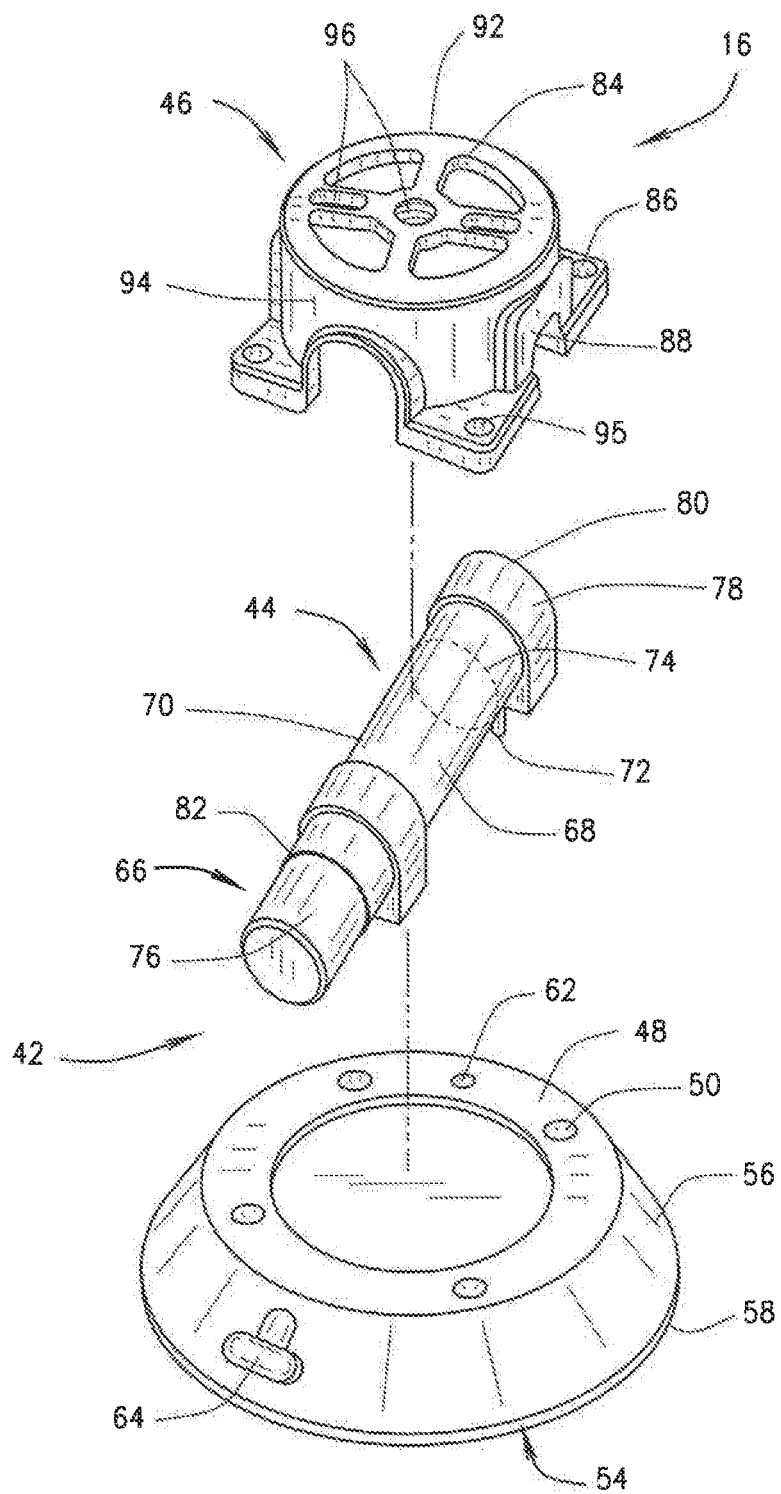
FIG. 3 is an exploded view of a vacuum device.

As shown in FIGS. 1-3, an embodiment of the present disclosure, generally referred to as a carrier system 10, includes a frame member 12, a mount 14 attached to the frame member 12 that is sized and shaped to couple with articles such as bikes and other recreational articles, and vacuum devices 16 attached to the frame member 12 that can detachably attach to a mounting surface 17 of a vehicle. The carrier system 10 can couple with a very wide variety of articles, including, but not limited to, a bicycle, skis, a snowboard, a surfboard, a canoe, or a kayak.

In this embodiment, the frame 12 is generally a linear bar 18 with enlarged generally circular portions 20 at each end that are each sized and shaped to mate with respective vacuum devices 16. (FIG. 3). However, the portions 20 can be any shape and size capable of mating with the vacuum device 16. In the embodiment of FIGS. 1-3, the frame 12 mates with two vacuum devices 16, such as with fasteners 13, to provide enough vacuum strength to withstand the tensions, shear, and other forces on the carrier system 10 during operation. Multiple vacuum devices 16 help stabilize the load and provide redundancy in the unlikely event that one or more vacuum device 16 fails. Preferably, the frame 12 is constructed from a material capable of handling the loads and tensions occurring during operation of the carrier system, such as metal, fiberglass, plastic, or other suitable materials.

The mount 14 includes an attachment member 24 that attaches to the outer face 26 of the frame 12, such as by welding, adhesive, fasteners, or other appropriate means (FIGS. 1-2). Extending from the attachment member 24, e.g., is a skewer assembly 28 sized and shaped to couple with front or rear fork arms 35 of a bicycle 37. The skewer assembly 28 can include a generally tubular housing 30 that defines a bore 32 along a center axis A-A. (FIG. 1). Generally cylindrical protrusions 34 can extend outwardly from each end of the housing 30 along the axis A-A. The protrusions 34 are shaped and sized to mate with the front clevises 36 of the fork arms, which first requires removal of the wheel. To secure the fork arms 35 to the skewer assembly 28, a skewer rod 36 inserts through the bore 32 and secures with fasteners, such as a nut 38 and a cam clamp 40. The cam clamp 40 can be tightened or loosened to secure and release the fork. Those skilled in the art will recognize that the mount 14 can include any other suitable arrangement that properly secures a recreational article, such as, straps, fasteners, clamps, cables, brackets, tethers, and the like. In addition, the mount 14 can include adaptors that accommodate various fork sizes and models, such as "Fork Up" available from Hurricane Components for 15 mm or 20 mm through-axle models. Also, the rear wheel of the bicycle 37 can be cradled in the rack instead of the front fork so that the front wheel does not need to be removed.

Each vacuum device 16 includes a vacuum pad 42 and an attached vacuum pump 44 (FIG. 3). A housing 46 attaches to the vacuum pad 42 to enclose and secure the vacuum pump 44 to the vacuum pad 42. The housing is 46 shaped and sized to enclose the vacuum pump 44 while allowing for the attachment of an accessory and likewise to a surface of a vehicle.

In the instant embodiment, the vacuum pad 42 is generally a conical frustum that defines a top face 48 having threaded holes 50 to mount with the housing 46 using fasteners 52. The vacuum pad 42 also includes a recessed vacuum face 54 being generally parallel to the top face 48, a sloped side surface 56 extending between the top face 48 and the vacuum face 54, and a generally circumferential seating edge 58 along the perimeter of the vacuum face 54. In this arrangement, the seating edge 58 can seat with the mounting surface 17 of a vehicle to form a vacuum cavity 60. The vacuum pad 42 defines a channel 62 extending from the top face 48 to the vacuum face 54 and sized to mate with the vacuum pump 44. Release tabs 64 extend outwardly from the side surface 56. The release tabs 64 are generally t-shaped ribs that are shaped and sized to enhance rigidity of the pad 42 and help prevent release of the vacuum device 16 from the mounting surface 17, such as during exposure to warmer temperatures.

Preferably, the pad 42 is made from a flexible material, such as, rubber, or plastic. However, the pad 42 can comprise any material that allows the vacuum pad 42 to seat with the mounting surface 17. Preferably, the material should not be prone to scuffing the mounting surface during installation or operation. In addition, the material can comprise any suitable color and may include other desirable attributes. For example, the pad 42 can be a reflective or glow-in-the-dark material so that it can be seen in dark environments.

The pump 44 in this embodiment includes a generally cylindrical plunger 66 and a hollow cylinder 68 that defines a chamber 70 sized and shaped to receive the plunger 66. The plunger 66 moves within the chamber 70 between a pressed position and a released position to create the vacuum cavity 60 between the vacuum face 54 and the mounting surface 17. The cylinder 68 has an opening to the chamber 70 at one end and is closed at the opposite end. A tube 72 extends generally perpendicularly from the closed end of the cylinder 68. The tube 72 is sized and shaped to insert into the channel 62 of the vacuum pad 42 to provide fluid communication between the cylinder chamber 70 and the vacuum cavity 60. The plunger 66 is sized to insert into the cylinder 68 with a sliding fit that allows the plunger 66 to move back and forth within the cylinder 68. A check valve 74 is positioned within the cylinder chamber 70 in communication with the chamber 70 and the tube 72 so that fluids and gases can only transfer into the tube 72 from outside of the cylinder 68. This allows the vacuum device 16 to be re-pumped without loss of remaining vacuum. In an alternate embodiment, an automatic pump can be used to increase the vacuum level of the vacuum device if it falls below a pre-determined level. In another alternate embodiment, a vacuum device includes a signaling component capable of indicating or sending a signal that indicates a loss of a designated amount of pressure, including, but not limited to, an audio signal, a visual signal, an electronic signal, or a wireless or Bluetooth® signal. For instance, the signaling component can send a wireless signal to a wireless phone and, in conjunction with appropriate software on the phone, indicate the vacuum pressure.

The plunger 66 is generally a rod with a push button 76 at one end, a seal 78 at the opposite end, and a biasing member 80 there between. The seal 78 is sized and shaped to seat against the inner wall of the cylinder 68. When the plunger 66 inserts into the cylinder chamber 70, the biasing member 80 biases the plunger 66 to the released position. The position of the plunger 66 in the released position will vary respective to the amount of vacuum pressure within the vacuum cavity 60.

An indicator 82 positioned about the lower portion of the push button 76 indicates to the operator the relative amount of vacuum pressure within the vacuum cavity 60. The indicator 82 is a colored ring or sleeve sized and shaped to attach around the lower portion of the push button 76. The indicator 82 can be red, yellow or another color or indication that is easily seen. Additionally, the indicator 82 can be a reflective or glow-in-the-dark material so that it can be seen in dark atmospheres and under water. When no vacuum pressure exists in the vacuum cavity 60, the biasing member 80 extends the plunger 66 to its most extended release position. In this position, the indicator 82 is fully visible. As the pressure increases in the vacuum cavity 60, the force of the vacuum lessens the bias of the biasing member 80, and, in turn, the plunger 66 extends less from the chamber 70 and less of the indicator 82 is visible.

The housing 46 is a generally a cylindrical member with a generally rectangular base which includes a top surface 84, bottom surface 86, first side 88, second side 90, third side 92, and pump side 94 (FIG. 3). The bottom surface 86 of the housing 46 defines housing apertures 96 for attachment to the vacuum pad 42 with fasteners. The top surface 84 defines attachment apertures 98 for attachment of accessories with appropriate means, such as fasteners, straps, and other suitable members. Although, housing apertures 96 and attachment apertures 98 are shown on the top side 84 of housing 46, those skilled in the art will recognize that housing apertures 96 and attachment apertures 98 can be located on any side 88, 90, 92, 94 of the housing 46. Also, the housing apertures 96 and attachment apertures 98 can be holes, slots, or any other configuration sized and shaped to accommodate different dimensions of various manufacturers' accessories. The housing 46 can be made from a variety of materials, including marine grade stainless steel, powder-coated aluminum, rubber or plastic.

All these pieces encompassing a rack can be readily assembled and disassembled and they can all be stored and placed in a protective carrying case for travel. For example, in the longest 2 (or any necessary number of) support bars, such as the side bars and/or the center bar of the race ready rack (see below) resides a "break and fold" assembly as shown in FIGS. 5-8. With these side or center bars folded in half, it allows the rack to fit in a case that can be traveled with easily.

In general operation, an operator places the vacuum face 54 of pad 42 against a mounting surface 17 of a vehicle, which creates a vacuum cavity 60 between the vacuum face 54 of the pad 42 and mounting surface 17. The operator repeatedly pushes the plunger 44 from the released position to the pressed position to remove fluid (air, gas, and/or water) from the vacuum cavity 60, thereby, reducing the pressure below the pressure of the surrounding atmospheric pressure. This creates a vacuum such that edge 58 and vacuum face 54 of pad 42 seat against the mounting surface 17. A vacuum exists whenever the pressure within the space is less than the pressure that surrounds it. To obtain an adequate vacuum for operation, the operator should repeatedly press the plunger 66 until the indicator 82 is no longer visible when the plunger 66 is in the released position. If at any time during operation, the indicator 82 becomes visible indicating a loss of vacuum, the operator can again repeatedly push the plunger 66 until the indicator 82 is no longer visible.

Speaking generally, once the carrier system 10 is attached to a mounting surface of a vehicle, a recreational device, such as a bicycle can be attached to the mount 14. In FIGS. 1-3, the clevises of the fork arms 35 mate with the protrusions 34 and are secured by inserting and tightening a skewer rod 36. In this position, the rear bicycle wheel rests on the mounting surface. When desired, the skewer rod 36 is loosened and the bicycle 37 can be removed.

To release the vacuum and remove the carrier system 10, the operator lifts the release tabs 64 on the side face 56 of pad 42 away from the mounting surface 17. In other embodiments, a valve stem can be activated to release the vacuum device 16. Additionally, a twist button with a course thread located on the top face of the pad 42 can be used to release the vacuum device 16.

Figure 4:
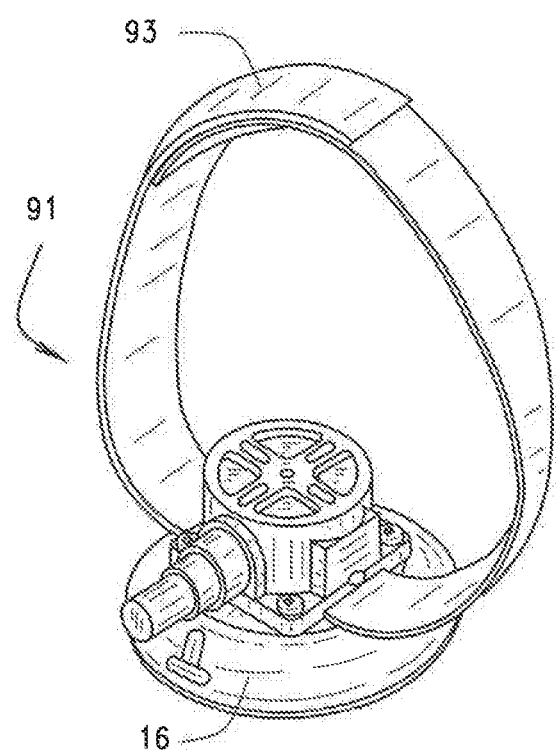
FIG. 4 is a perspective view of a rear wheel mount.
Figure 5:
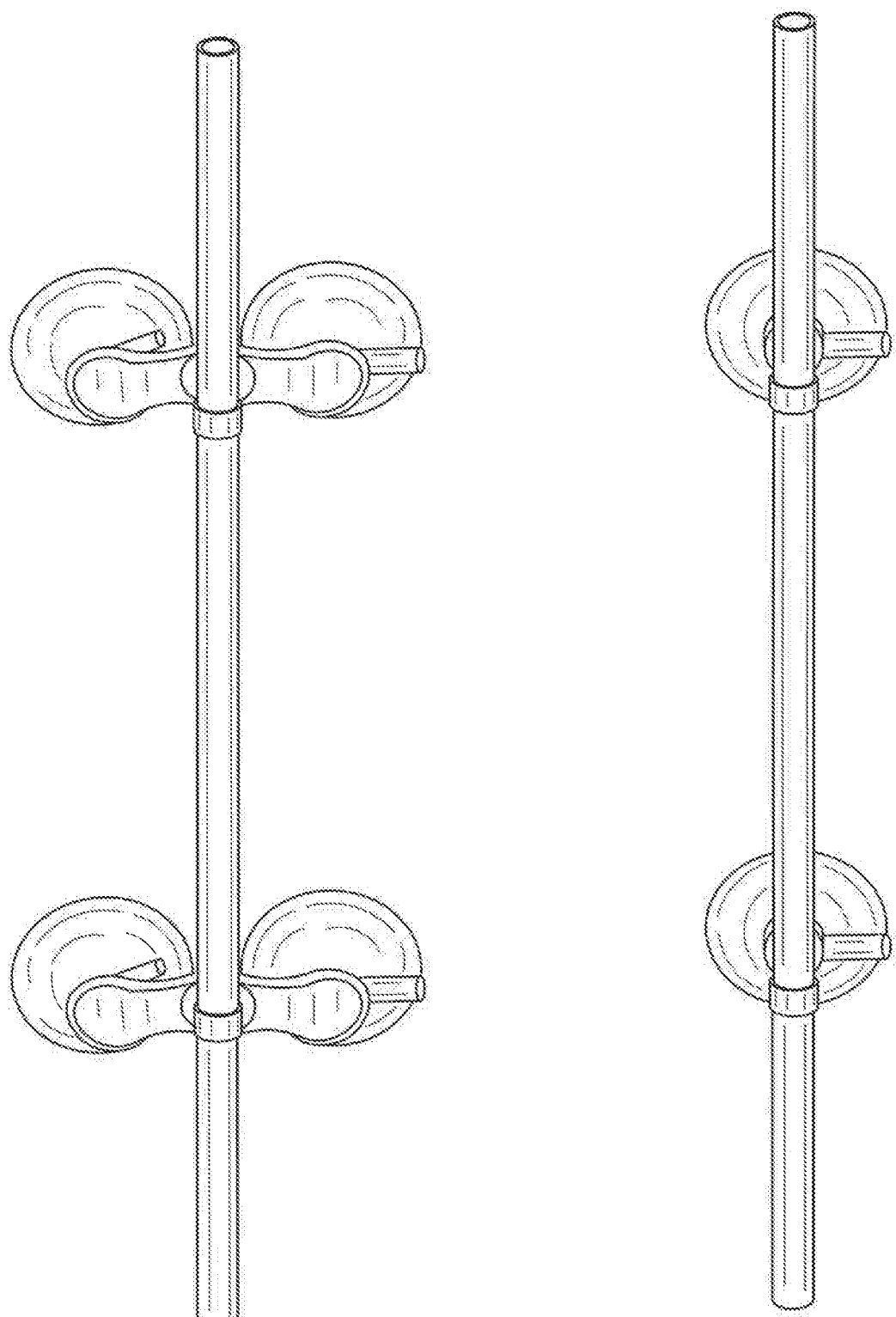
FIG. 5 is a perspective view of a vacuum-based carrier systems according to an embodiment of the invention in which the support bar contains a break and fold point junction.
Figure 6:
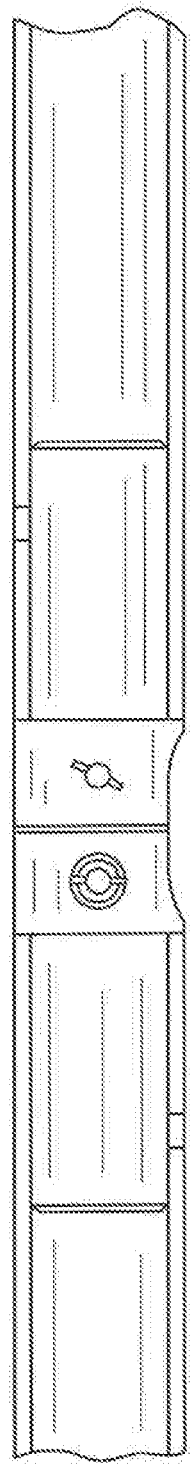
FIG. 6 is a front view of the support bar of FIG. 5 showing a closer view of the break and fold point junction when the bar is in the closed position.
Figure 7:
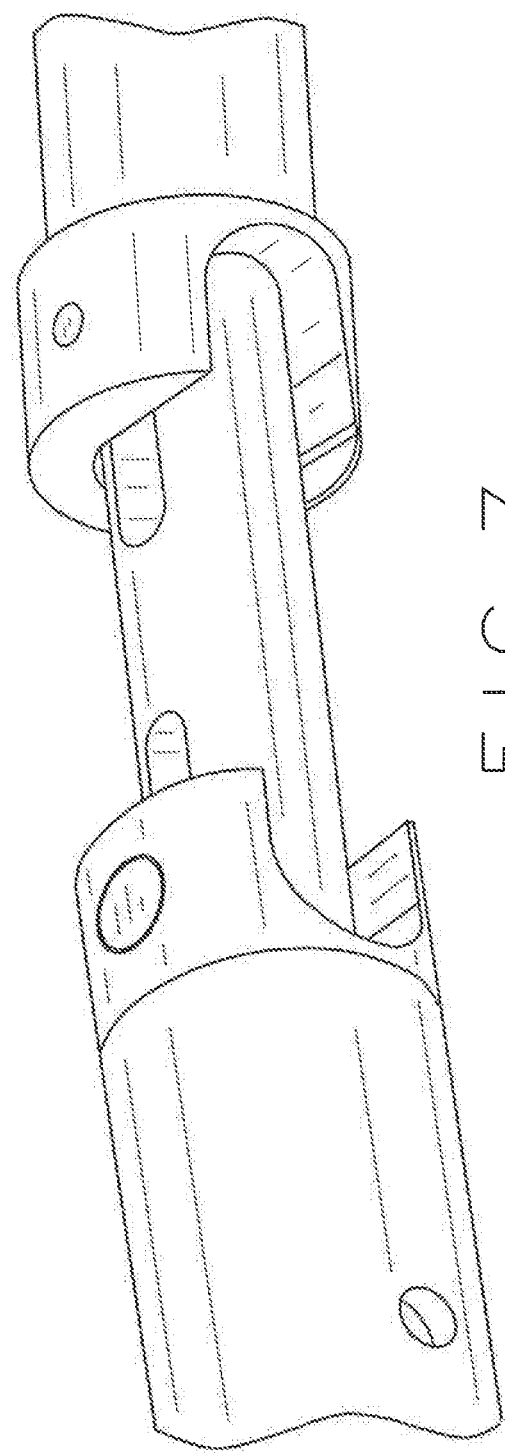
FIG. 7 is a front perspective view of the break and fold point junction of the support bar of FIG. 5 shown after the parts of the bar have been pulled apart, but before folding.
Figure 8:
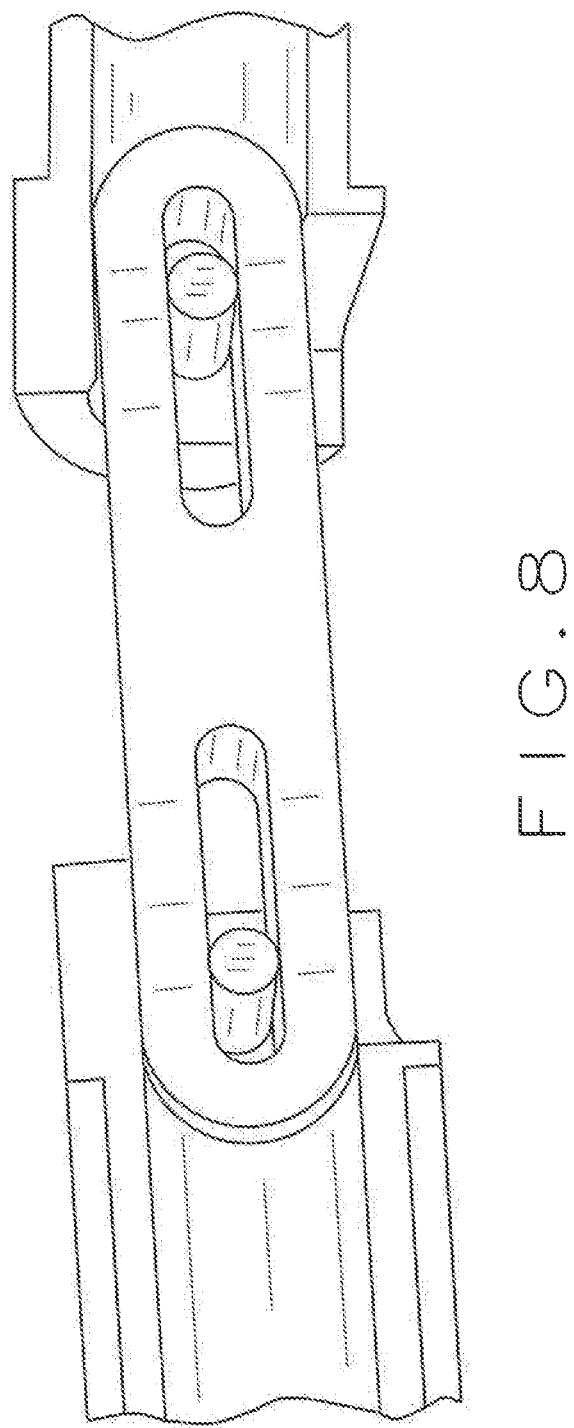
FIG. 8 is a front, cutaway view of the break and fold point junction shown in FIG. 7.
Figure 9A:
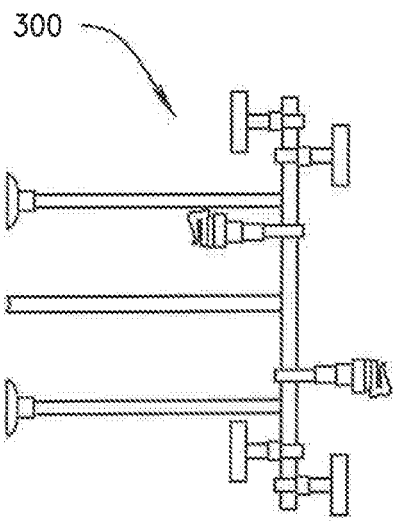
FIG. 9(a, b, c and d) shows various views of a hitch rack according to an embodiment of the hitch rack of the invention.
Figure 9B:
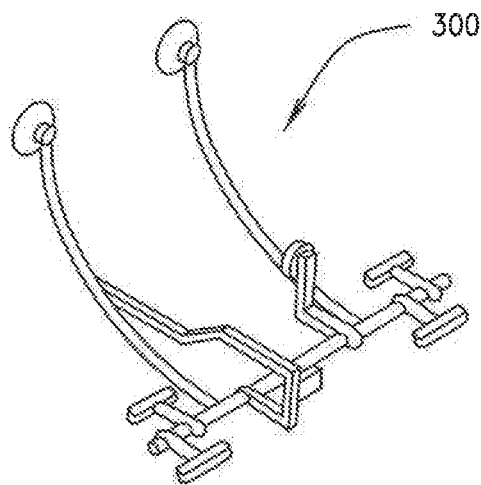
Figure 9C:
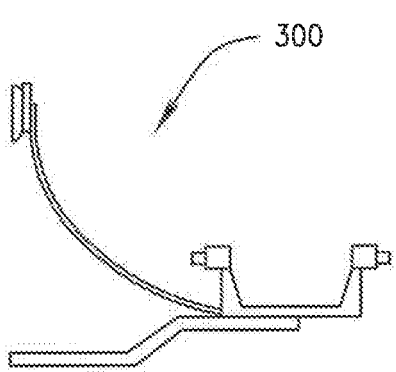
Figure 9D:
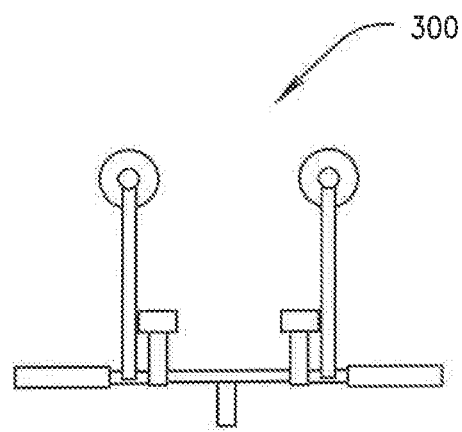

As shown in FIG. 4, the carrier system 10 can also include a rear wheel mount 91 for securing the rear wheel of a bicycle 37 while the front of the bicycle 37 is secured to the mount 14. The rear wheel mount 91 can be a vacuum device 16 that includes a securing strap 93, such as a hook and loop material strap, for securing the rear wheel of the bicycle 37. Use of the rear wheel mount 91 may enhance the securement of the bicycle 37 to mount 14 and prevents the rear wheel of the bicycle 37 from contacting the vehicle.

The carrier system 10 can also be embodied in the various forms of FIGS. 9-12, which are specifically designed to reduce the vacuum-based carrier system footprint, speed up the attachment and removal of the bicycle or other article from the carrier and in general, meet the needs and provide the advantages described herein. For ease of understanding, components common between the alternate embodiments are identified with similar reference numbers.

As mentioned previously, cross bars on roofs have been used for nearly as long as cars have had roofs. However, the size of these bars makes it problematic to have a bar that is long enough to span the roof of a vehicle in order to hold items such as cargo boxes, bikes, kayaks, and stand up paddle boards, but which can be removed for storage or travel without the bars. It is typically too difficult to transition fixed bars off and on and travel with items which are this long. Applicant has addressed this problem with its reduced footprint carrier system. In this embodiment, the carrier system uses the vacuum-based system according to the embodiment of FIGS. 1-4 as described above. A cross bar system is created to hold items on the roof such as cargo boxes, bikes, snow boards, skis, stand up paddle boards, surf boards, kayaks and other water toys. Additionally, other items like wood, pipes and/or other construction materials or general use items, can be carried, thereby converting a standard car, e.g., without any rails to an alternative way to carry items on the roof. As noted, many cars today do not have rails and some have glass roofs, making it hard or even impossible to mount a fixed cross bar system. The cross bars are the same as described in the team rack embodiment (see above and below). This embodiment of the system also produces a reduced footprint and reduced environmental impact, by having a "break and fold" piece at the center. See FIGS. 5-8. The bar is pulled apart and then can be folded in half (or at another appropriate point in which to be folded). See, respectively, the shoulder bolts 103 which are contained in and can slide along slots 105 in a hinge pin 107, located in a hinge sleeve 109. Shoulder bolt 111 is used to fold in the parts. Once folded, the cross bar system conveniently fits in a trunk or back portion of a vehicle for storage, or at a temporary site until needed. This system can be traveled with as well since it is practical to then fit it in luggage. Once at one's destination it can again be taken out and it will fit on any vehicle, such as a rental car.

Figure 10:
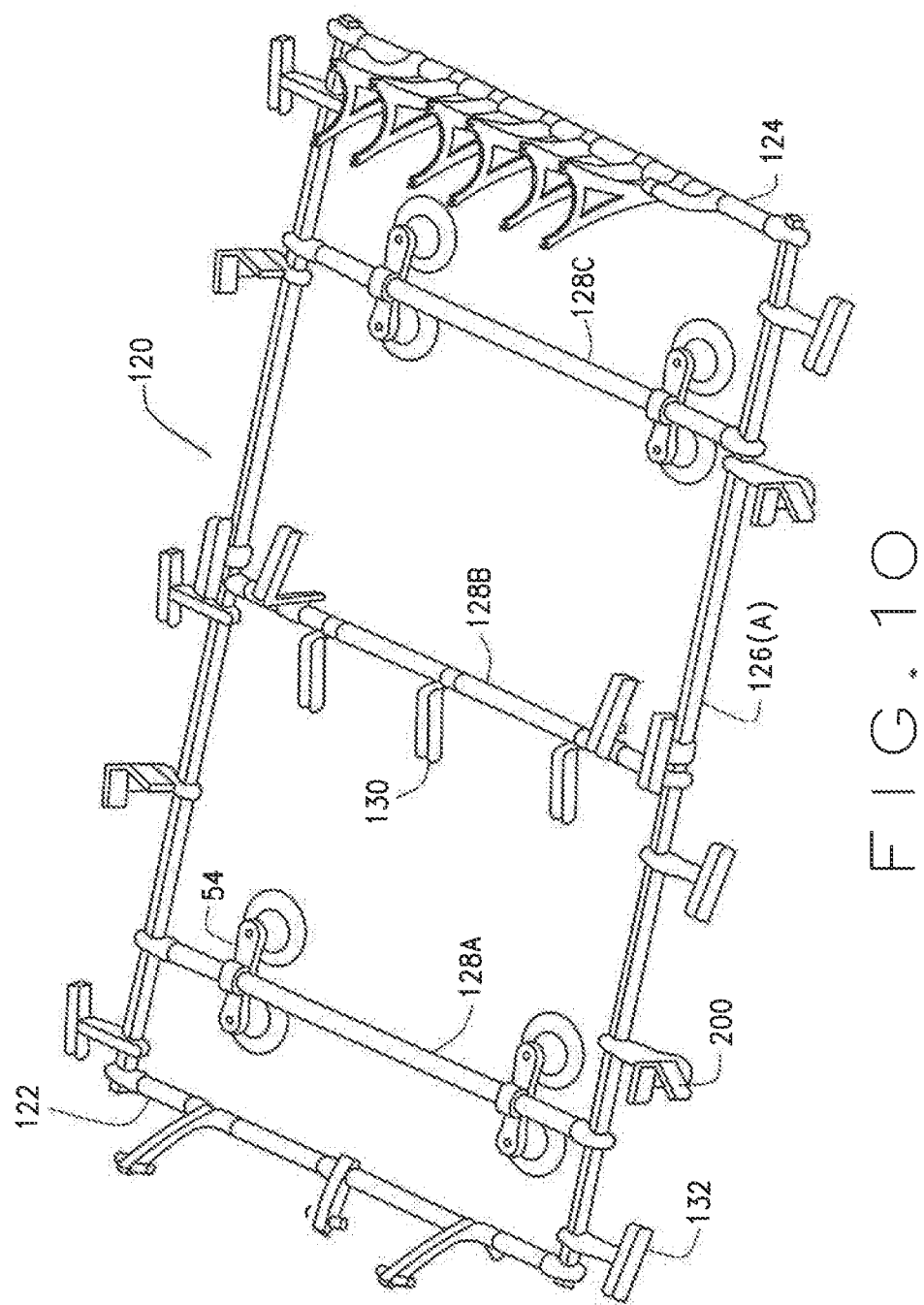
FIG. 10 shows a top elevation view of a team rack according to an embodiment of the invention.
Figure 11:
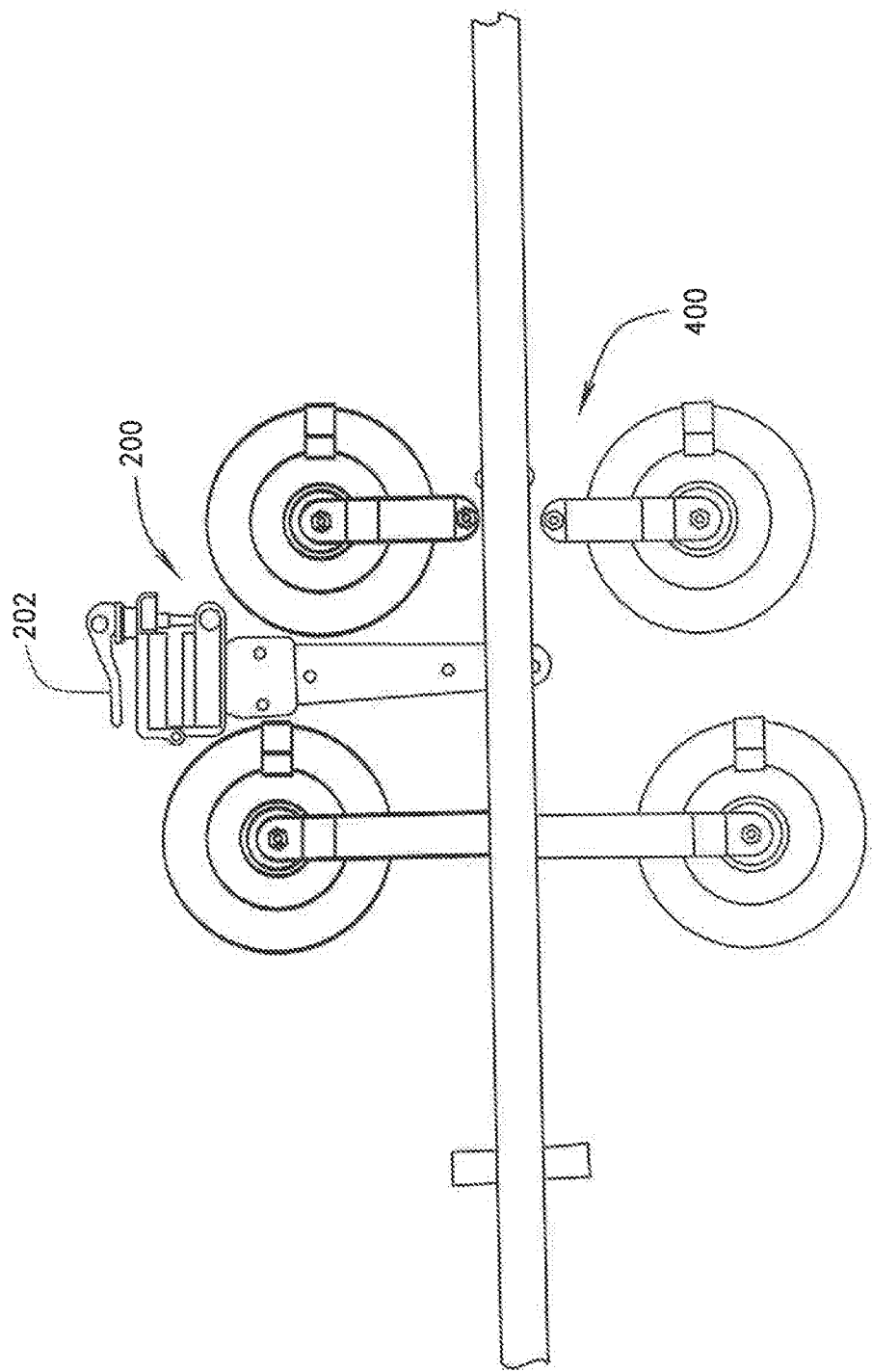
FIG. 11 is a top view of an embodiment of a komodo-style carrier system with a crank arm clamp attachment; and, FIG. 12 is a front perspective view of the carrier system of FIG. 11 highlighting its crank arm clamp and wheel trays.
Figure 12:
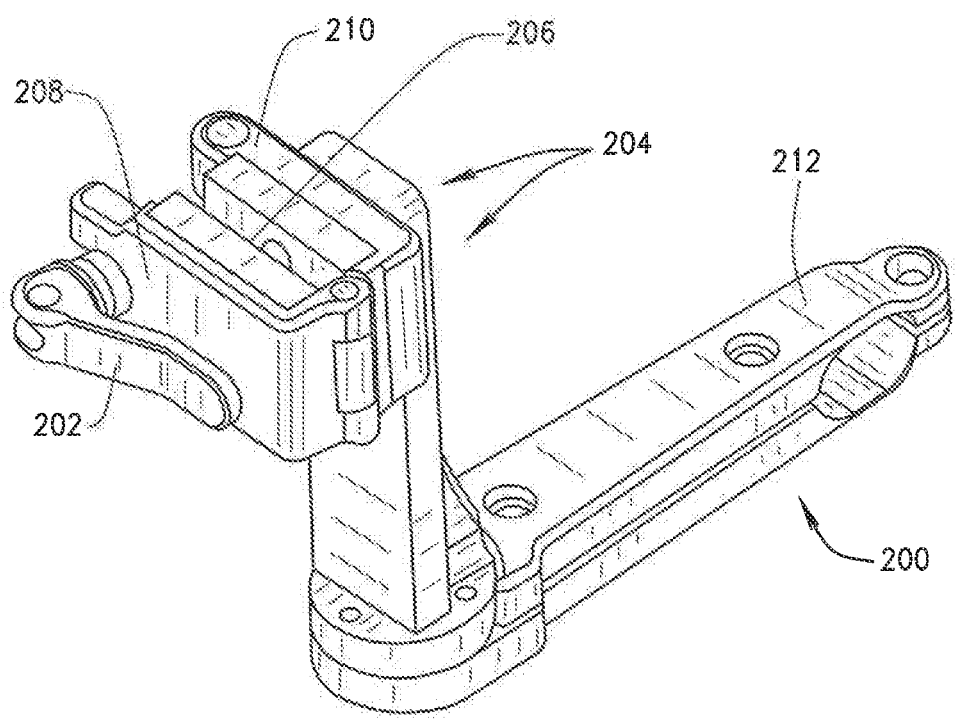
Figure 13:
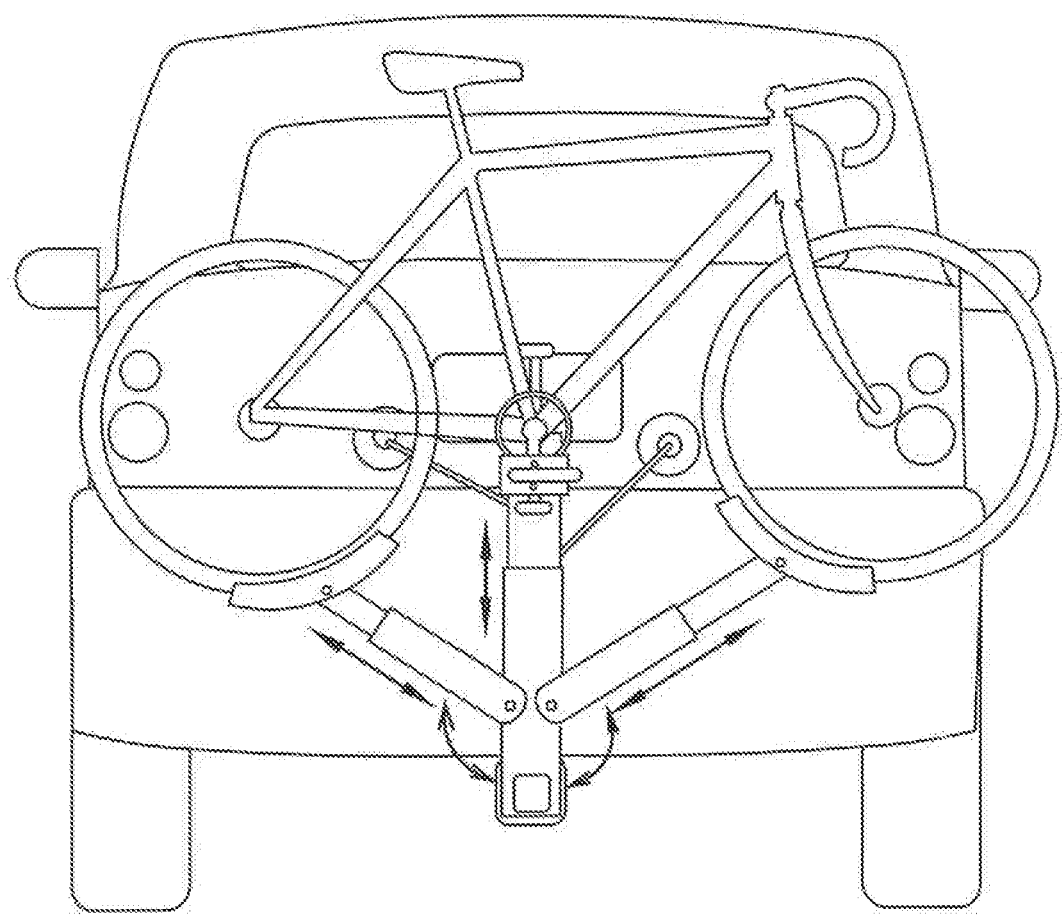
FIG. 13 is a rear view of an alternative embodiment of a hitch rack.

In a "team" or "race ready" rack embodiment, as shown in FIG. 10, the carrier system again utilizes the substantial vacuum-based holding power of the system shown in FIGS. 1-4. However, in addition to a greatly reduced footprint, in this embodiment the race ready rack can readily be fitted with a wide variety of vehicles and multiple bikes can be "released" for racing in 10 seconds or less. In this embodiment, a 7-9 bicycle bike rack is used for team competitions and has at least 4 "race ready" positions where the entire bike can be taken off easily in less than 10 seconds, preferably less than 5 seconds, and most preferably in 1-2 seconds. The race ready rack fits any car without needing special adaptors and does not need to be fixed or welded, so the rack can be used on multiple styles and shapes of vehicles. Thus, when a team gets a new vehicle, e.g., from a new sponsor, the bike rack can simply be switched to the new car in a matter of just a few minutes. In the race ready embodiment of the reduced footprint vacuum-based carrier systems of the invention, the racks can be lightweight and can be dis-assembled easily to fit into a travel case such as one that can be checked in as baggage for travel.

In the race ready embodiment as shown in FIG. 9, a race ready rack 120 structure is created with tubing, preferably aluminum or other lightweight material, and preferably in an oval or round bar shape. In this embodiment, the carrier system's rack structure has 4 main sides—a front cross bar 122a, rear cross bar 124, and 2 side bars 126a and b for driver and passenger sides. Additionally, more bars 128 (a, b, c) are used in the cross direction. One of the cross bars holds at least 2 vacuum mount assemblies, and a rear cross bar holds at least two more vacuum mount assemblies. A center crossbar holds adjustable rear wheel trays that capture the rear wheels of, e.g., 5 fork-mounted bikes 130. In this embodiment, is where the "break and fold" assembly is included to ensure it stays fixed on assembly. These bars may be cut to a desired size and connected via machined aluminum 2-piece capture brackets. Brackets are preferably 2-piece so that they can be taken off and put back on without having to slide down a bar. Each capture bracket has an appropriate number, e.g., 6, screws, or other securement items to ensure that the proper tension is applied to secure to the bars, thus creating a tension that is right for the race rack assembly structure. Preferably, there are 4 race ready mounted bicycles, 2 on each side with race ready bike wheel trays 132 and in general the spacing and dimensions used are similar to those of other team racks familiar to those skilled in the art. Spacing and dimensioning of the race rack components is established such as, e.g., to enable 9 bikes to fit comfortably on the rack, with the 4 race ready ones situated on the outside positions, and 5 more (or whatever number is deemed appropriate) fork mounted bikes in between. In this carrier system, e.g., it may be configured so that the middle (or non-race ready) bicycles have their front wheels removed, and there is room on the rear and or front bar to hold 4-6 front and/or rear or the combination of front and rear wheels mounted on the wheels axles, as is common in the art.

In the instant embodiment, the outside 4 bikes can be held on via a down tube clamp or seat post clamp, or other common clamps used in the industry. The preferred method for this embodiment of this invention, however, is to use a crank arm clamp 134. Use of a crank arm clamp (see FIG. 12) creates a holding mechanism at the lowest point by which to hold the bike versus other methods. It also enables the user or mechanic to reach the bike more easily and quickly. When used, the crank arm clamp 200 can be the only necessary holding point so that when the cam lever 202 is released on the crank arm clamp 200, the bike is immediately free to be taken off the rack. This creates an ultra-fast bicycle release from the rack, allowing for the bike to be ready to race in no more than 10 seconds, preferably less than 5 seconds, and most preferably in just 2-3 seconds. In this embodiment, the wheels can rest in front and rear wheel trays 130, without the wheels being held there. They only rest in the trays. However, it is possible also to place straps on the trays or to create a clamp within the tray to apply extra force to hold the wheels more firmly if/when desired, e.g., for long haul travel, or, e.g., when subject to severe winds or difficult weather conditions. The clamp assembly can be adjustable on the side bars of the rack assembly as are the wheel trays so that a desirable position can be found for different types and sizes of bikes using the system of the invention. Preferably, a 2-piece clamping system is again used so that the assembly does not have to be slid into place, which takes more time and effort and creates unnecessary complexity for assemble The angle of the clamp can also be adjustable, which helps with different style bikes and crank arms. Some crank arms have power meters attached and the clamp should be adjustable to fit above or below the power meter to work properly. In a preferred embodiment, the clamp 204 of the crank arm clamp 200 has rubber pieces 206 on the inside front and back sections and is most preferably a rubber of suitable durometer so that when the clamp 204 is engaged the rubber walls mold some around the crank arm enabling the crank to avoid becoming damaged, yet to hold with enough force to completely secure the bicycle. Preferably, the wheel trays are also adjustable and some made to be higher and some lower so that certain sections of the abutting bikes do not interact with each other. For instance, where the rear axle of one bike, and the front axle of an abutting bike come in close contact and are the wider parts of the bikes, by raising one and lowing the other the widest part of the axles will miss each other and the bikes can be placed closer together as a result. Other components of the crank arm clamp 200 include a movable jaw 208 and a fixed jaw 210 and the clamps mount base 212. A more minimalist alternative embodiment of this rack can be made to hold, e.g., two bicycles. This is accomplished by using shorter side rails to hold one bike instead of two and a single cross bar to connect the two to give the rack stability in the cross direction. Two vacuum cups on the leading edge of each side with a single vacuum cup in the rear section is sufficient to stabilize the load and present two bicycles held with the crank arm as described above with both wheels staying remaining on the bicycles.

In another embodiment, the front and rear cross bars holding vacuum mount assemblies also act to further strengthen the rack structure. Each vacuum mount assembly can be adjusted across the bar to obtain their desired placement on the roof of any vehicle, and the entire bar can be moved forwards or backwards to further assist in obtaining any desired position on the roof. In this embodiment, these vacuum mount assemblies have, e.g., 2 6" vacuum cups each giving the mount, as tested, at least 250 pounds of vertical force per cup, which becomes at least 500 pounds per vacuum assembly multiplied by 4 vacuum assemblies, equaling over 2000 pounds of holding power. This provides ample holding power for a 70 pound rack and, e.g., nine 15 pound bicycles. The vacuum assembly can also be made to be adjustable in height to enable the rack to get closer to or further away from the roofline of the vehicle to create a better aerodynamic and or aesthetic.

In addition to wheel mounts and fork mounts, antennas for TV coverage camera mounts, and other not yet conceived items can be added utilizing the 2 part clamp system.

The side bars may also be slightly bent to enable a better aesthetic of the bars more closely following the roof line of certain vehicles.

All these pieces encompassing the entire rack can be assembled and disassembled in less than an hour and they can all be stored and placed in a protective carrying case for travel. In this embodiment, the longest 2 bars are the side bars and in their center resides the "break and fold assembly". See FIGS. 5-8. With these side bars folded, e.g., in half, the rack is configured to fit in a case that is ready for travel.

As noted above, one of the more popular methods to carry bikes on a vehicle is via a hitch on the rear of the vehicle. However, to carry bicycles, the hitch receiver is used to accept a bike rack, not for towing. As also noted, this can result in significant footprint and stability issues.

Applicant has succeeded in creating a hitch rack utilizing the principles of its invention to greatly reduce a hitch rack's footprint. The vacuum-based hitch rack of the invention is light enough and foldable so that it can easily be taken off and traveled with. This is accomplished without compromising, and indeed, enhancing the stability of the rack, and is ensured to have a steady, non-moving hitch rack system despite using less materials and a lighter weight design. Using the crank arm clamp 200 described above as to the team rack embodiments, which provide a greatly reduced footprint bike rack holder (as there are no pressure bars or long bars with clamps or wheels to be removed), a hitch rack 300 is made to hold, e.g., 1-4 bikes. The materials used are preferably lightweight aluminum and plastics, and with only the hitch being used as the anchor, the rack would be expected to be very unstable due to the use of the lightweight materials and bars. In this embodiment, however, the rack is made to be very stable with the use of the vacuum mount system (see above description). At least two vacuum cups 10 can be used on lanyards or adjustable cables or straps 302 deployed out to the back of the vehicle and mounted and placed strategically to tighten the bike rack back towards the vehicle. Hitch racks are notorious for shaking as they have the opportunity to do so both forwards, backwards, and sideways. However, in this embodiment of the invention, all movement or play is taken out or minimized by pulling the rack back to take out any play via the vacuum mount to rack cable or strap system being pulled in or tightened. This is achieved by placing the cup 10 a little further away from the rack and then pumping it down, which further tightens the load. A vacuum cup 10, for instance, when not engaged, sits ⅛" or more higher, but when pumped and engaged a cup descends closer to the surface, e.g., another ⅛" or more. So once approximately a cable length is realized to get the cup to the back of the vehicle, the cup can be pulled a little further, still tightening the cable back to the load. Then, when engaging the pump even more pull is realized to steady the rack. Preferably the cups 10 are attached to the rack via a call that can be pulled and wound in an enclosure so that when a rack is not in use the cup can be stored close to the rack or bars as the cable will wind up inside, but yet can be pulled out to any desired length when needed. As with regard to the overarching object of the invention, a hitch rack 300 is achieved that has as small a footprint as possible, and thus, is easy to pack and travel with. Accordingly, as in the team rack and rack replacing roof crossbars, described above, the bars can make use of the "break and fold" breakaway bar system in the instant embodiment. Accordingly, one or more of the hitch rack bars, e.g., the base bar 304 and/or the receiver hitch adaptor 306 can also be "broken" and folded for easy travel and compactness. Thus, when the hitch rack of the invention is installed on a vehicle it is designed to keep as small a footprint as possible, especially when no bikes are being carried. With the example of a two bike model, the attaching bars can ascend up from the body of the hitch rack and like an artificial Christmas tree's arms, be folded out at the break point like the rooftop crossbars previously described. The "break position" enables the rack to have all the bars positioned together in an upward line. However, one or more of the bars also can be folded down and engaged with a bicycle or other article. On the ends of these bars can be capture points, e.g., for the front and rear wheels like seen on the team rack (see above).

In an embodiment, a slot rack with a single bike rack option is provided. Additional bars and segments can be added going up and out or back to hold more bicycles and the corresponding amount of vacuum mounts can be added to stabilize the load as is needed. This greatly reduces the footprint of the instant hitch rack.

In another embodiment of the vacuum-based carrier system, a crank arm is placed on a rack as depicted in FIGS. 1-4, with a fork mount and a wheel cradle with vacuum mount added—one for the front wheel and one for the rear wheel. It yet a further embodiment, a vacuum-based carrier system of the invention is configured so that a bike or other article can be hung off, e.g., the rear glass of a vehicle like a van, wagon, SUV, or hatchback with a hook at the top to cradle the bike and a crank arm clamp in a lower position. In this embodiment, the remaining front or rear wheel is left hanging in the air as the crank arm clamp and the hook provide sufficient holding power with the vacuum-based system to securely anchor the bike. So the bike could go on the front wheel at top or front wheel at bottom, the bottom wheel will hang, and the top wheel will be held with a hook or cradle and secured with a crank arm clamp as already described elsewhere in this application.

In this aspect of the invention, the super small footprint of a "Komodo"-style rack is further enabled so that it can fit on the back of a small sports car or convertible and, in addition, the front wheel does not have to be taken off. The same vacuum-based carrier rack can also be used for both mountain bikes and road bikes rather than utilizing two different sized komodo-style racks. In this embodiment (see FIG. 11), a crank arm clamp 200 can be utilized with a komodo-style carrier system. See application Ser. No. 15/760,571, which is hereby incorporated by reference.

The reduced footprint vacuum-based carrier system of the instant invention is designed to fit into, e.g., a storage and traveling case shaped and sized to receive the dissembled carrier. An alternate embodiment of the case can receive the carrier while still assembled for storage and transport.

The case can also receive additional accessories or parts. For example, the case can be configured to store straps, clamps, connectors and other such items.

In all of the embodiments, the frames are preferably made from a lightweight metal, such as aluminum or plastics to reduce the footprint of the vacuum-based carrier system as much as feasible. However, there may be structural or other rationales for use of other suitable materials. These can include, but are not limited to, steel, plastic, or composite material. Alternatively, the frame can be composed of a flexible material, such as Starboard® polymer material or other plastic, which eliminates the need for slits.

Changes can be made in the above constructions without departing from the scope of the disclosure. It is intended that all matter contained in the above description or shown in the accompanying drawings shall be interpreted as illustrative and not in a limiting sense.

What is claimed is:

1. A vacuum-based hitch rack carrier system for a vehicle having a rear hitch and rear hitch receiver, comprising:
    a plurality of vacuum devices, each having a pad shaped and sized to removably seat with a vehicle to form a vacuum cavity,
    a plunger attached to the pad and in fluid communication with the vacuum cavity, and an indicator associated with the vacuum device to indicate the level of vacuum pressure within the vacuum,
    a receiver hitch adapter for joining a rack configured to secure an article to the vehicle via attachment to the vehicle's rear hitch receiver,
    a mount shaped and sized to mate and secure the article,
    one or more support bars attached to said mount,
    wherein the one or more support bars contains a break and fold assembly configured to allow the carrier system to be folded.

2. The carrier system of claim 1, further comprising a traveling case sized and shaped to receive the carrier system when disassembled.

3. The carrier system of claim 1 wherein the one or more support bars comprises a base bar and the mount is affixed to the base bar.

4. The carrier system of claim 1 further comprising a crank arm clamp configured for release of a fully assembled bicycle.

5. The carrier system of claim 3 wherein the system comprises at least a first and a second vacuum device and a first and a second tensioning strap, wherein the first tensioning strap attaches the first vacuum device and the second tensioning strap attaches the second vacuum device to the base bar.

6. The carrier system of claim 5 wherein the system further comprises a first and a second call for winding the first and second straps to aid in storage of the system.

7. A carrier system for a vehicle comprising a first frame member along the carrier systems longitudinal axis shaped and sized to mate and secure a recreational article, a plurality of vacuum devices having a pad shaped and sized to removably seat with a vehicle to form a vacuum cavity, a plunger attached to the pad and in fluid communication with the vacuum cavity, and an indicator positioned on the plunger to indicate the level of vacuum pressure within the vacuum cavity, and the frame having at least a first mount sized and shaped to couple with recreational articles, the plurality of vacuum devices being attached to the frame and configured to detachably attach to a mounting surface of a vehicle, the frame being substantially arcuate in configuration, and further comprising a crank arm clamp attached to the frame configured for release of a fully assembled bicycle.

8. The carrier system of claim 7 further comprising a second frame member pivotally connected to the first frame member so as to pivot between an operating position and a storage position.

\* \* \* \* \*